(12) United States Patent
Massey et al.

(10) Patent No.: US 6,793,400 B2
(45) Date of Patent: Sep. 21, 2004

(54) FLOATING CONNECTOR CLIP

(75) Inventors: Daniel M. Massey, Carlisle, PA (US); Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 44 days.

(21) Appl. No.: 10/044,717

(22) Filed: Jan. 11, 2002

(65) Prior Publication Data

US 2003/0133664 A1 Jul. 17, 2003

(51) Int. Cl.[7] ................................................ G02B 6/36
(52) U.S. Cl. .......................... 385/53; 439/247; 439/248
(58) Field of Search ................................. 385/136–138, 385/53; 439/247–248, 701

(56) References Cited

U.S. PATENT DOCUMENTS

| | | | |
|---|---|---|---|
| 3,848,956 A | 11/1974 | Kraft ........................... 459/411 |
| 4,131,257 A | 12/1978 | Sterling ...................... 248/67.5 |
| 5,123,071 A | * 6/1992 | Mulholland et al. .......... 385/53 |
| 5,138,680 A | 8/1992 | Briggs et al. .................. 385/90 |
| 5,398,295 A | * 3/1995 | Chang et al. .................. 385/53 |
| 5,873,746 A | 2/1999 | Morlion et al. ............. 439/247 |
| 5,931,688 A | 8/1999 | Hasz et al. .................. 439/247 |
| 6,027,360 A | 2/2000 | Jenkins ........................ 439/364 |
| 6,030,242 A | 2/2000 | Cunningham et al. ...... 439/247 |
| 6,033,247 A | 3/2000 | Gregory, II .................. 439/248 |
| 6,095,852 A | 8/2000 | Gregory, II ............... 439/540.1 |
| 6,139,346 A | 10/2000 | Cecil, Jr. et al. ........... 439/247 |
| 6,168,473 B1 | 1/2001 | Hsin ........................... 439/676 |
| 6,210,216 B1 | * 4/2001 | Tso-Chin et al. ........... 439/701 |

* cited by examiner

*Primary Examiner*—Javaid H. Nasri
(74) *Attorney, Agent, or Firm*—Woodcock Washburn LLP

(57) ABSTRACT

A clip assembly for holding a connector includes a pair of opposing frames that are held together by latches. Apertures formed in the clip assembly restrain movement of the connector along three axes.

26 Claims, 2 Drawing Sheets

FLOATING CONNECTOR CLIP

FIELD OF THE INVENTION

This invention relates to connector components, and more particularly, to a frame for fiber optic connectors.

BACKGROUND OF THE INVENTION

Fiber optic cable and connector assemblies are well-known. A particular type of fiber optic connector is the MT (Mechanically Transferable) type, such as MTP or MPO types. MT style connectors, which are multifiber connectors that are in widespread use, typically include a connector body and a connector sleeve. The connector sleeve is capable of sliding on the body, which actuates a latching mechanism inside the body. The sleeve typically includes a pair of opposing edges or lips on both its upper and lower surfaces.

The MT style connector, as well as many other conventional connectors, generally effectively align the fibers connected therein in the absence of external forces. However, external forces applied to the connectors may adversely interfere with alignment of the fibers connected therein.

There is a general need for components that enhance the connectability and functionality of fiber optic components.

SUMMARY OF THE INVENTION

A clip that secures at least a pair of connectors is provided. The clip enables the connectors secured by the clip to be handled, as well as engaged and disengaged, as a group with mating connectors.

A floating clip frame assembly for retaining at least a pair of connectors may include a frame assembly that has inboard contact surfaces and a pair of opposing front and rear face contact surfaces. The front and rear face contact surfaces restrict movement of the connectors in a direction along a connector longitudinal axis. The inboard contact surfaces restrict movement of the connectors in a plane that is perpendicular to the connector longitudinal axis. Undercut surfaces on the front and rear portions of the frame may be employed.

The frame assembly may be formed by a discrete pair of opposing first and second inter-latching frame members, or frame members that are otherwise secured or held mutually together. The frame members may be configured such that the first frame member and the second frame member have the same shape. In this regard, the first frame member and the second frame member may be capable of being produced in the same mold.

DETAILED DESCRIPTION OF A PREFERRED EMBODIMENT

Figure 1:
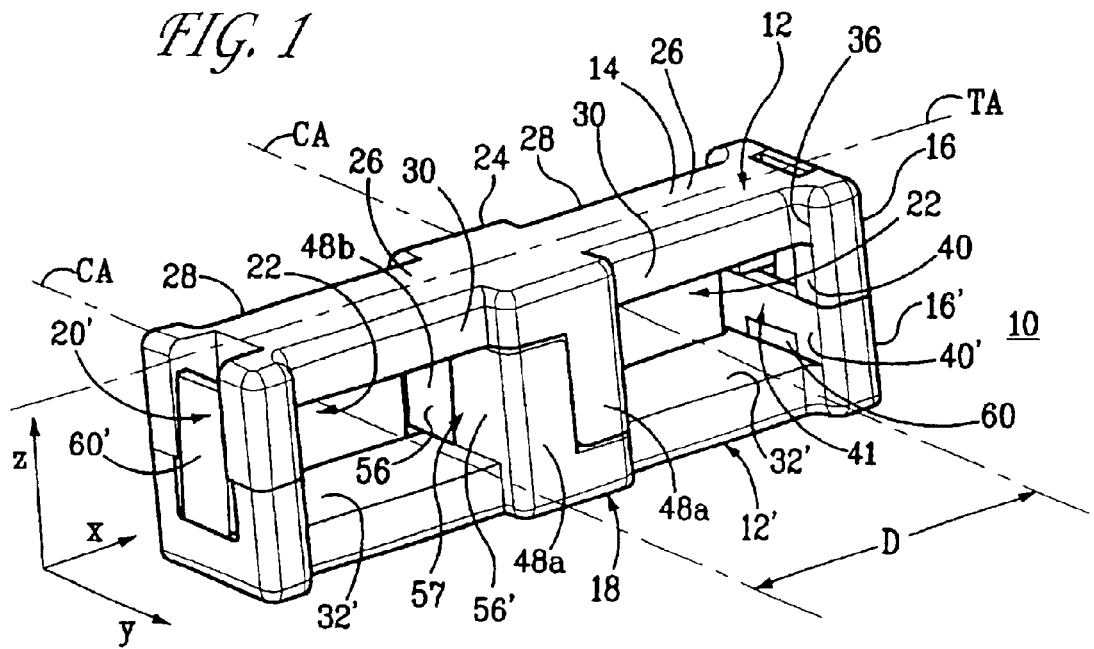
FIG. 1 is a perspective view of the clip frame assembly according to an embodiment of the present invention.

A clip frame assembly 10 is shown in FIG. 1. Assembly 10 preferably includes a pair of opposing first and second frame members 12 and 12', which are shown as identical parts such that a single mold (not shown) may be employed to form each of frame portions 12 and 12'. As explained more fully below, the identical parts are formed such that inverting (that is, re-orienting or rotating the part along a y-axis) the first frame member 12 relative to the second frame member 12' enables mating portions on the frame members 12 and 12' to engage or mate. The present invention, however, is not limited to a pair of identical parts, or hermaphroditic parts or otherwise engaging parts, but rather encompasses a clip having any combination of the features described or claimed herein, as well as variations thereof that will be understood by persons familiar with connector technology.

Because second frame 12' preferably is identical to first frame 12, first frame 12 is described below, and the description of second frame 12' is generally omitted. Corresponding parts or portions of second frame 12', however, are explicitly referred to where beneficial for the understanding of the structure or function of the present invention. Where corresponding parts of frame 12' are referred to, a prime designation after the reference numeral is employed.

Preferably, frame 12 is formed of a single, unitary part, although the present invention encompasses other configurations. Preferably, frame 12 is formed of plastic by injection molding or like conventional process. Frame 12 includes a frame transverse portion 14, frame side portion 16, and frame column assembly 18. Frame transverse portion 14 has a longitudinal axis TA that is perpendicular to a longitudinal axis CA of a connector, as described more fully below. Frame transverse portion 14 has a wide portion 24, where the width is measured along connector longitudinal axis CA. The width of wide portion 24 may be chosen to enable the components of column assembly 18 to be suitably formed.

Relative to wide surface 24, an undercut portion 26 is formed on at least one side of transverse portion 14, and preferably on each, opposing side of transverse portion 14. Undercut portion has a width that is less than the width of wide portion 24. Thus, an undercut surface 28 is formed on a first face of transverse portion 14 and undercut surface 30 is formed on an opposing second face of transverse portion 14. Frame transverse portion 14 also forms an inboard contact surface 32 within the inner edges of undercut contact surfaces 28 and 30.

Each frame side portion 16 extends substantially perpendicular from transverse portions 14 proximate ends thereof. Side portions 16 may each have a width that is greater than that of undercut 26, thereby forming a shoulder 36 therebetween. As explained more fully below, the width of side portions 16 may be chosen to provide sufficient structure to enable the components of latch assemblies 20 to be formed therein. Each side portion 16 terminates, in the z direction, at a mating surface 38, as best shown in FIG. 1. An inboard portion of side portion 16 forms a side portion inboard contact surface 40 which preferably is in communication with transverse portion contact surface 32.

Figure 2:
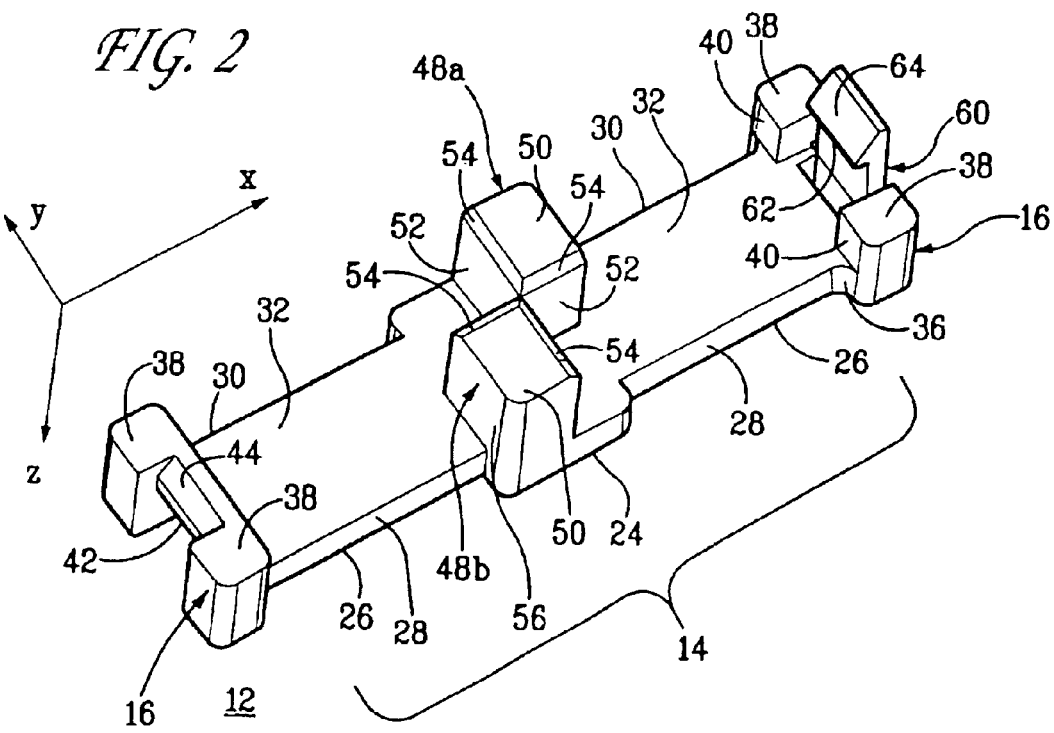
FIG. 2 is a perspective view of a portion of the frame assembly shown in FIG. 1.

Each side portion 16 preferably includes a portion of the latch assembly 20. In this regard, frame 14 has a left side portion 16 and a right side portion 16, as oriented in FIGS. 1 and 2. Left side portion 16 has a cut-out that forms a landing 42. As best shown in FIG. 2, landing 42 has a sloped underside 44. Right side portion 16 includes a latch member 60 that extends downward below transverse portion contact inboard surface 32. Latch member 60 includes an inwardly projecting hook or lip 62 with a sloped leading edge opposite lip 62. Latch member 60 is preferably integrally formed with frame portion 12, and may also be formed of additional pieces or comprise any other latch configuration familiar to persons skilled in the art suitable for securing frame portions 12 and 12' together.

The present disclosure employs latches, such as latch assemblies 20, that secure or hold frame portions together. The present invention is not limited to the particular latching or holding structure shown in the Figures, but rather also encompasses other means for securing or holding, including other latch assemblies (which will be apparent to persons familiar with connector technology), interference or friction fit between a protruding portion on one part that is received in a corresponding part, a continuous sleeve that encompasses both opposing parts, key interlocks (such that twisting or sliding one part relative to a corresponding part secures the parts together), and other holding or securing structure that will be apparent to persons familiar with connector technology.

Column assembly 18 extends between opposing frame transverse portions 14 and 14' and is formed between the left and right side portions 16. A pair of column members 48a and 48b extend downwardly (as oriented in FIG. 1) to frame inboard contact surface 32 of frame member 14. Column members 48a and 48b are staggered such that they mate or interface with opposing column members 48a' and 48b' on opposing frame member 12'. Further, the present invention encompasses an interference fit, light or intermittent contact, and/or a gap between column members 48a, 48b and members 48a', 48b'. Frame members 48a and 48b are shown with a rectangular cross section, although cylindrical posts or other shapes may be employed.

Preferably, each post 48a and 48b has a distal surface 50 that is substantially flat. Also, each post 48a and 48b includes a pair of interior mating surfaces 52 on the inward-facing side faces thereof. Another inward-facing side face of each of column members 48a and 48b forms a column contact surface 56. The fourth side of column members 48a and 48b faces outwardly. Preferably, a pair of inward facing edges 54 (that is, those formed at the interface between interior mating surfaces 52 and distal surface 50) are chamfered to enhance assembly.

Figure 4:
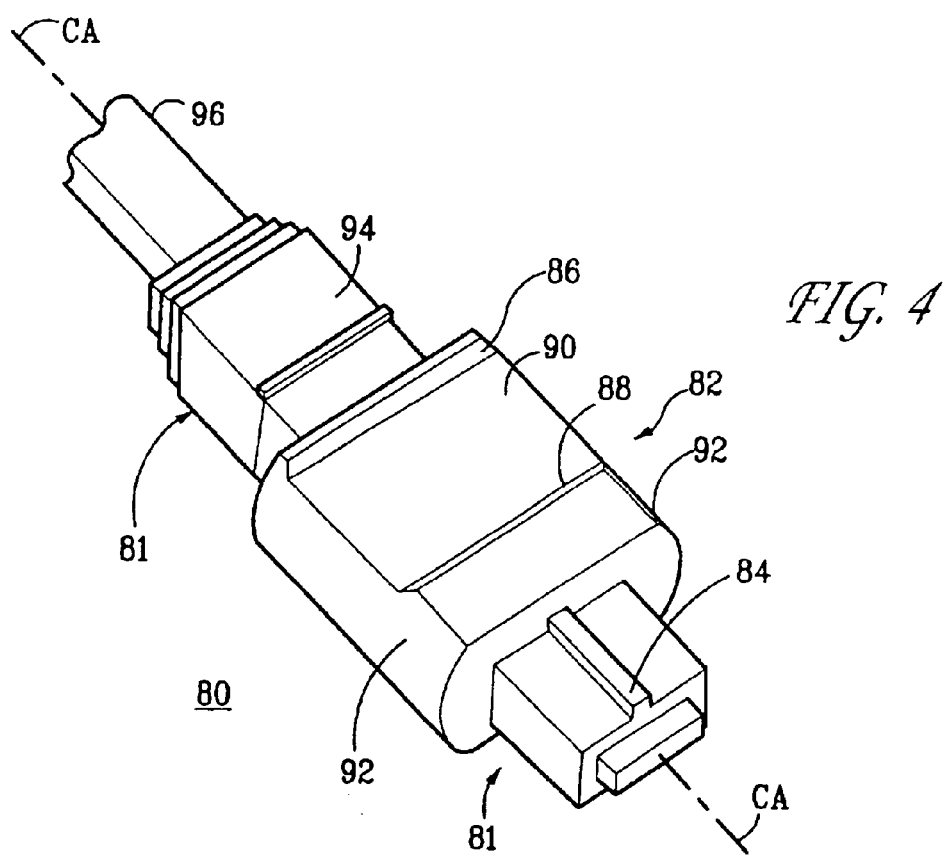
FIG. 4 is a diagrammatic view of connector with which the clip frame assembly of FIG. 1 may be employed.

FIG. 4 illustrates a connector 80 that may be employed with clip assembly 10. Connector 80, as shown in the Figures, preferably is a conventional MT fiber optic connector (including MTP and MPO styles, and the like), and includes a cable 96 and a strain relief apparatus 94 attached to a back end thereof. Connector 80 includes a body 81 that extends through a sleeve 82. Body 81 houses the fiber optic components (not shown) and includes a key 84 disposed on an upper side thereof. Connector 80 defines connector longitudinal axis CA.

Figure 3:
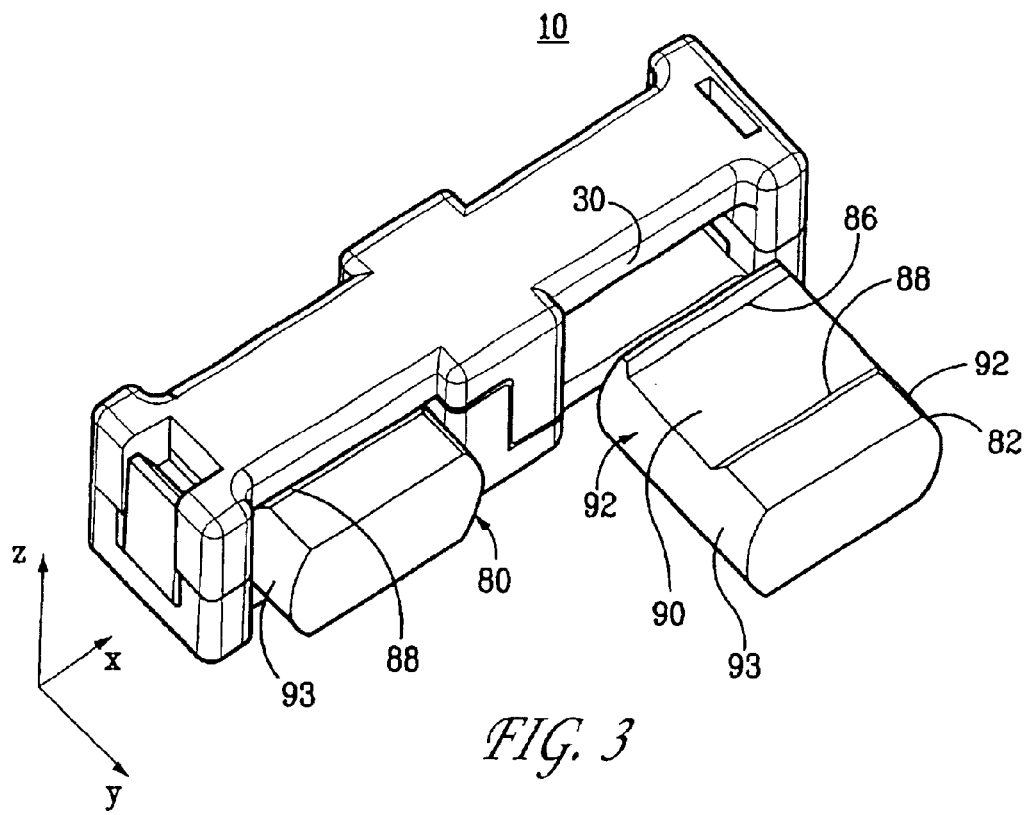
FIG. 3 is a perspective view of the clip frame assembly of FIG. 1 showing portions of connectors relative to the frame assembly.

Sleeve 82 includes front and rear shoulder or lip 86 and 88, respectively. Lips 86 and 88 may have any configuration capable of engaging the corresponding contact portions 28 and/or 30 of clip assembly 10. Thus, clip assembly 10 maybe employed with a connector that has an angled inward facing portion, as best shown in FIG. 3, with a connector having a face that is parallel to the z axis, or with any other configuration.

A contact surface 90 is disposed between lips 86 and 88. Preferably, sleeve contact surface 90 is substantially planar, and the present invention also encompasses non-planar contact surfaces. Preferably, both the top side and bottom side of sleeve 82 includes the lip 86,88 and contact surface 90 configuration. Between its top and bottom, sleeve 82 has a pair of opposing outwardly bulging or convex sides 92. Thus, the bulge on each side 92 of sleeve 82 preferably defines a distal contact line of contact or point 93 at the outermost portion of the sides 92.

The assembled clip frame assembly 10, as shown in FIG. 1, includes frame members 12 and 12' that are latched together by latches 20. The left and right mating surfaces 38 of first frame member 12 rest on, or are in contact or close proximity with, opposing, respective left and right mating surfaces 38' of second frame member 12'. Similarly, column distal surfaces 50 rest on, or are in contact or close proximity with, the mating inboard contact surface 32' of opposing frame member 12'. Likewise, column distal surfaces 50' of second frame 12' rest on, or are in contact or close proximity with, the mating inboard contact surface 32 of opposing first frame member 12.

The reference numeral 41 refers to a combination of adjacent portions of side portion first contact surface 40 and second contact surface 40'. Thus, the overall left side inboard contact surface 41 (not shown in the Figures) includes the left portion of both first and second side contact surfaces 40 and 40'. Likewise, the overall right side inboard contact surface 41 includes the right portion of both the first and second side contact surfaces 40 and 40'. In the assembled configuration, first latch member 60 fastens the right portion of clip assembly 10 together by engaging second landing 42' (not shown in the Figures). Likewise, second latch member 60' fastens the left portion of clip assembly 10 together by engaging second landing 42.

First column members 48a and 48b, preferably, are staggered so as to combine with second column members 48a' and 48b' to form a box-like structure. Thus, first column members 48a and 48b are disposed at opposite corners of column 18, and second column members 48a' and 48b' are opposed at the pair of opposite corners that are adjacent to those of first members 48a and 48b. Thus, the interior mating surfaces 52 of first column members 48a and 48b' are proximate to the interior mating surfaces 52' (not shown in the Figures) of second column members 48a' and 48b'. The chamfer surfaces 54 aid engagement or assembly of column members 48a, 48b, 48a', and 48b'.

The reference numeral 57 refers to a combination of adjacent portions of column member first contact surface 56 and second contact surface 56'. In this regard, a left portion of contact surface 57 is formed by the contact surface portions of column members 48a' and 48b. Likewise, a right portion of contact surface 57 is formed by the contact surface portions of column members 48a and 48b' (the latter column is not shown in the Figures).

The assembled clip frame assembly 10, as shown in FIG. 1, defines a pair of through-apertures 22. A left one of apertures 22 is bounded on its top and bottom by left portions of the first and second inboard contact surfaces 32 and 32' of first and second transverse frame members 14 and 14'. Likewise, a right one of apertures 22 bounded on its top and bottom by right portions of the first and second inboard contact surfaces 32 and 32' of first and second transverse frame members 14 and 14'. The left and right portions of the inboard contact surfaces 32 and 32' are separated by column assembly 18. Apertures 22 are bounded on their outer sides by left and right inboard contact surfaces 41. Apertures 22 are bounded on their inner sides by left and right column contact surfaces 57.

Each one of apertures 22 define a centerline that is parallel with connector longitudinal centerline CA. As best shown in FIG. 1, the left and right apertures may be spaced apart by a predetermined center-to-center distance D. For example, for conventional MPO or MTP connectors, an aperture spacing D of 20 mm may be employed. The present invention is not limited to any particular dimensions, and thus the dimensional information disclosed herein is for illustration purposes only.

To assemble the first and second frame members 12 and 12' with a pair of connectors, such as MT fiber optic connector 80, first frame member 12 may be inverted relative to second frame member 12' such that first column members 48a and 48b are staggered and mate with second column members 48a' and 48b', and such that first and second latch members 60 and 60' engage with corresponding second and first landings 42' and 42 at opposite ends of clip assembly 10. Prior to final positioning or latching first and second frame members 12 and 12' together, a connector 80 is inserted into each one of apertures 22.

In this regard, a sleeve 82 of a first connector 80 and a sleeve 82 of another connector 80 may be loosely inserted or aligned in the left and right apertures 22, respectively, of one or both frame members 12 and 12'. Frame members 12 and 12' may be brought together such that latch sloped surfaces 64 and 64' contact the sloped undersides 44' and 44, respectively, to urged latch members 60 and 60' outwardly until lip 62 and 62' can engage landings 42' and 42, respectively. Preferably, latch members 20 and 20' are resilient. Thus, frame members 12 and 12' may be coupled together and secured together by latches 20. FIG. 3 illustrates a latched configuration, including a connector 80 coupled to clip assembly 10 at the left side of FIG. 3. Components of the body of the connector 80 are omitted from FIG. 3 for clarity.

In such a latched position, inboard contact surfaces 32 of transverse frame member 14 contacts sleeve contact surface 90 (and inboard contact surface 32' contacts sleeve contact surface 90 disposed on the underside of sleeve 82) to limit movement of the connector 80 vertically (that is, in the z direction), inboard contact surfaces 41 of frame side portions 16 and/or 16' contact the side contact portions 93 of connector 80 to limit movement of the connector 80 transversely or laterally (that is, in a direction parallel to the x-axis or the TA axis), and undercut contact portions 28 and 30 contact rear and front lips 86 and 88, respectively, to limit movement of the connector 80 along a longitudinal axis of the connector (that is, parallel to the y-axis, or along the CA axis).

Connector 80 is restrained from movement relative to clip assembly 10 along each direction of three axes. Such a configuration is beneficial, for example, for spacing the pair of connectors 80 apart by a predetermined distance. Thus, the transverse dimension (that is, along the x-axis) of column 18 may be chosen to provide a predetermined centerline distance between the connectors 80, which may be useful for mating with like-spaced mating connectors (such as receptacles) or for other spacing considerations. Further, clip assembly 10 preferably is not part of a fixed chassis, and thus is capable of floating relative to related equipment components so as to enhance handling of the pair of connectors 80. Clip 10 and the sleeves 82 of a pair of connectors 80 disposed in apertures 22 may be moved together relative to the body of connectors 80, thereby simultaneously actuation the internal spring components of both connectors 80.

Sleeves 82 preferably include the contact surfaces 86, 88, and 90 on both their top and bottom portions, and thus may be inverted relative to clip 10. Thus, connectors may be oriented such that both keys 84 are pointing up, both keys are pointing down, a combination in which one key (either the left or the right) is pointing up and the other is pointing down. Further, the present invention encompasses a configuration in which a pair of connectors 80 are arranged one on top of the another (not shown), rather than side by side as shown in the Figures. For such a configuration, a twist boot may be employed.

The present invention encompasses further variations, and is not limited to the particular embodiment shown herein. For example, the present invention encompasses a clip assembly that forms more than two apertures 22 such that more than two connectors 80 may be secured. In this regard, more than one column assembly may be employed. Any number of apertures may be formed. The terms "top," "bottom," "left," "right," and the like, are provided for convenience of description, and it is clear that such terms should not be construed as absolute. Numerous additional variations are contemplated in structure, function, and materials, as will be understood by persons familiar with connector components in view of the present disclosure. Thus, the present invention should not be limited to the features of the particular embodiment described herein.

We claim:

1. A floating clip frame assembly for retaining at least a pair of connectors, the frame assembly comprising:

a pair of opposing transverse frame portions, each one of the transverse frame portions including a transverse frame inboard contact surface;

a pair of opposing side frame portions disposed proximate opposing ends of the transverse frame portions, each one of the opposing side frame portions including a side frame inboard contact surface;

a column extending inwardly from the transverse frame portions, the column including a pair of opposing column inboard contact surfaces;

an latch assembly for securing the opposing frame portions together;

said transverse frame portions, side frame portions, and column forming at least a pair of through apertures for receiving the connectors, the through apertures defining a longitudinal axis;

a pair of longitudinally opposing undercut portions formed at least partly on at least one of the transverse frame portions, the undercut portions including longitudinally opposing undercut contact surfaces adapted for contacting a lip portion of a connector, whereby the undercut contact surfaces limit movement of the connector along the longitudinal axis, the transverse frame portion inboard contact surface limits vertical movement of the connector, and the column contact surface and the side frame contact surface limit transverse movement of the connector.

2. The floating clip frame assembly of claim 1 wherein the transverse frame inboard contact surfaces, side frame inboard contact surfaces, and the column inboard contact surfaces define the through apertures.

3. The floating clip frame assembly of claim 1 wherein the assembly for securing includes a latch member and a landing, the latch member extending from a first one of the transverse frame portions, the landing being formed on a second one of the transverse frame portions, the latch including a protruding lip that engages the landing to secure the first and second transverse frame portions together.

4. The floating clip frame assembly of claim 1 wherein a first one of the transverse frame portions, first portions of the side frame portions, and first portions of the column are formed in a unitary first frame member.

5. The floating clip frame assembly of claim 4 wherein a second one of the transverse frame portions, second portions of the side frame portions, and second portions of the column are formed in a unitary second frame member.

6. The floating clip frame assembly of claim 5 wherein the first frame member and the second frame member have the same shape.

7. The floating clip frame assembly of claim 6 wherein the first frame member and the second frame member are capable of being produced in the same mold.

8. The floating clip frame assembly of claim 6 wherein the latch assembly includes first and second latch members and first and second landings, the first latch member extending from an end of a first transverse frame portion, the first landing being formed on an opposing end of the first transverse frame portion, the second latch member extending from an end of a second transverse frame portion, the second landing being formed on an opposing end of the second transverse frame portion, the first latch engaging the second landing and the second latch engaging the first landing to secure the first and second frame members together.

9. The floating clip frame assembly of claim 6 wherein the column is formed by a first column member and a second column member, the first column member extending from the first frame member, the second column member extending from the second frame member.

10. The floating clip assembly of claim 9 wherein the first column member extends to the inboard contact surface of the second transverse frame member.

11. The floating clip assembly of claim 10 wherein the second column member extends to the inboard contact surface of the first transverse frame member.

12. The floating clip assembly of claim 5 wherein each one of the first and second side frame portions include mating surfaces, the mating surfaces of the first side frame portions contacting the mating surfaces of the second side frame portions.

13. The floating clip frame assembly of claim 1 wherein the undercut portions have a smaller longitudinal dimension than that of the side frame portions.

14. A floating clip frame assembly for retaining at least a pair of connectors, the frame assembly including inboard contact surfaces and a pair of opposing front and rear face contact surfaces disposed on exterior and outwardly facing portions of the frame assembly, the front and rear face contact surfaces restricting movement of the connectors in a direction along a connector longitudinal axis, the inboard contact surfaces restricting movement of the connectors in a plane that is perpendicular to the connector longitudinal axis, the frame assembly being formed by a discrete pair of opposing and inter-latching frame members, wherein at least one of the frame members includes a front undercut portion having a longitudinal dimension smaller than that of the inboard contact surfaces, the front face contact surface being disposed on the front undercut portion.

15. The floating clip frame assembly of claim 14 wherein said at least one frame member includes a rear undercut portion longitudinally opposing the front undercut portion, the rear face contact surface being disposed on the rear undercut portion.

16. A floating clip assembly for retaining at least a pair of connectors, the floating assembly comprising:

a pair of opposing frames, each one of the frames including a frame contact surface;

a pair of opposing sides disposed proximate ends of the frames, each one of the opposing sides including a side contact surface;

a column extending inwardly from the frames, the column including a pair of opposing column contact surfaces;

a securing means for holding the opposing frames together;

said frames, sides, and column forming at least a pair of through apertures for receiving the connectors;

an undercut portion formed at least partly on at least one of the frames, the undercut portion disposed on an exterior and outwardly facing portion of the frame assembly and including an undercut contact surface adapted for contacting a lip portion of the connector, whereby the undercut contact surface limits movement of a connector along a longitudinal axis of the connector, the frame inboard contact surface limits vertical movement of the connector, and the column contact surface and the side contact surface limit transverse movement of the connector.

17. The floating clip frame assembly of claim 16 wherein the securing means includes a latch member and a landing, the latch member extending from a first one of the opposing frame, the landing being formed on a second one of the opposing frame, the latch including a protruding lip that engages the landing to secure the first and second frames together.

18. The floating clip frame assembly of claim 16 wherein a first one of the frames, first portions of the sides, and first portions of the column are formed in a unitary first frame member.

19. The floating clip frame assembly of claim 18 wherein a second one of the frames, second portions sides, and second portions of the column are formed in a unitary second frame member.

20. The floating clip frame assembly of claim 19 wherein the first frame member and the second frame member have the same shape.

21. The floating clip frame assembly of claim 20 wherein the first frame member and the second frame member are capable of being produced in the same mold.

22. The floating clip assembly of claim 16 wherein the undercut portions have a smaller longitudinal dimension than that of the sides.

23. A floating clip frame assembly for retaining at least a pair of connectors, the frame assembly including inboard contact surfaces and a pair of opposing front and rear face contact surfaces disposed on exterior and outwardly facing portions of the frame assembly, the front and rear face contact surfaces restricting movement of the connectors in a direction along a connector longitudinal axis, the inboard contact surfaces restricting movement of the connectors in a plane that is perpendicular to the connector longitudinal axis, the frame assembly being formed by a discrete pair of opposing and inter-latching frame members, wherein each one of the frame members include an undercut portion formed thereon, the undercut portions forming the front and rear contact surfaces.

24. The floating clip frame assembly of claim 23 wherein the frame members are identical.

25. The floating clip frame assembly of claim 23 wherein each one of the front and rear contact surfaces and inboard contact surfaces are capable of contacting a corresponding connector to achieve the restriction of movement.

26. The floating clip frame assembly of claim 25 wherein each one of the front and rear contact surfaces and inboard contact surfaces contact a corresponding connector to achieve the restriction of movement.

* * * * *